(12) United States Patent
Sanchez

(10) Patent No.: US 12,008,353 B2
(45) Date of Patent: Jun. 11, 2024

(54) PARSING TOOL FOR OPTIMIZING CODE FOR DEPLOYMENT ON A SERVERLESS PLATFORM

(71) Applicant: CDEV, LLC, Newark, DE (US)

(72) Inventor: Daniel Sanchez, Chapel Hill, NC (US)

(73) Assignee: CDEV, LLC, Newark, DE (US)

( * ) Notice: Subject to any disclaimer, the term of this patent is extended or adjusted under 35 U.S.C. 154(b) by 114 days.

(21) Appl. No.: 17/823,585

(22) Filed: Aug. 31, 2022

(65) Prior Publication Data

US 2023/0083849 A1 Mar. 16, 2023

Related U.S. Application Data

(60) Provisional application No. 63/239,015, filed on Aug. 31, 2021.

(51) Int. Cl.
*G06F 8/60* (2018.01)
*G06F 8/41* (2018.01)

(52) U.S. Cl.
CPC .............. *G06F 8/60* (2013.01); *G06F 8/427* (2013.01)

(58) Field of Classification Search
CPC ....................................................... G06F 8/60
See application file for complete search history.

(56) References Cited

U.S. PATENT DOCUMENTS

| 9,841,959 B2* | 12/2017 | Li | G06F 8/443 |
| 2007/0165856 A1* | 7/2007 | Sylla | G07F 17/32 |
| | | | 380/232 |
| 2009/0190154 A1* | 7/2009 | Noguchi | G06F 3/1288 |
| | | | 358/1.13 |

* cited by examiner

*Primary Examiner* — Jae U Jeon
(74) *Attorney, Agent, or Firm* — NK Patent Law

(57) ABSTRACT

A computer-implemented method that automatically parses an input source code files containing multiple functions to create one or more files, each containing a single-purpose function, for deployment on a serverless computing platform, such as Function-as-a-Service ("FaaS"), is disclosed herein. The method includes receiving an input source code file and creating a mapping table from the input source code file. A first function from the input source code file is mapped and a single-function output file for the first function is generated. The single-function output file is then deployed, for example, on the serverless computing platform.

16 Claims, 15 Drawing Sheets

INPUT SOURCE CODE FILE 102

```
1   import os           ⎱ 402
2   import json         ⎰
3
4   #<Z>                 ⎱ 404a
5   os.mkdir("newdir")   ⎰ 404b
6
7   a = 1               ⎫
8   b = 2               ⎬ 406
9   c = "a string"      ⎭
10
11
12  def myfunction1():                      ⎫
13      x = a + b                           ⎪
14      y = a - b                           ⎬ 408
15      as_json = json.dumps({'x':x, 'y':y})⎭
16
17
18  def myfunction2():          ⎫
19      x = a + b               ⎪
20      y = a - b               ⎬ 410
21      as_dict = {'x':x, 'y':y}⎭
22
23
24
25  def myfunction3():   ⎱ 412
26      x = a + b        ⎰
```

FIG. 4

*cdev.parse_function_from_file("<path_to_folder>/example.py", "myfunction1")*

LIST OF SYMBOLS 502

| os |
| json |
| a |
| b |
| c |
| *myfunction1()* |
| *myfunction2()* |
| *myfunction3()* |

LIST OF STATEMENTS 504

| 1-1 | |
| --- | --- |
| 2-2 | YES |
| 5-5 | |
| 7-7 | YES |
| 8-8 | YES |
| 9-9 | |
| 12-15 | YES |
| 18-21 | |
| 25-26 | |

FIG. 5A

OUTPUT SOURCE
CODE FILE 506

```
import json                                      ⎤ 402 a = 1                                            ⎤
b = 2                                            ⎦ 406 def myfunction1():                               ⎤
    x = a + b                                    ⎟
    y = a - b                                    ⎟ 408
    as_json = json.dumps({'x':x, 'y':y})         ⎦
```

FIG. 5B

OUTPUT SOURCE
CODE FILE 508

```
a = 1
b = 2
```
} 406

```
def myfunction2():
    x = a + b
    y = a - b
    as_dict = {'x':x, 'y':y}
```
} 410

FIG. 5C

OUTPUT SOURCE
CODE FILE 510

```
import os                    }- 402

#<Z>                         ]404a
os.mkdir("newdir")           ]404b a = 1                        }
b = 2                        }- 406 def myfunction3():           }
    x = a + b                }- 412
```

FIG. 5D

PARSING TOOL FOR OPTIMIZING CODE FOR DEPLOYMENT ON A SERVERLESS PLATFORM

CROSS-REFERENCE TO RELATED APPLICATIONS

This application claims the benefit of U.S. Provisional Patent Application No. 63/239,015, filed on Aug. 31, 2021, the entire contents of which is hereby incorporated herein by reference.

TECHNICAL FIELD

The field of the invention relates generally to serverless computing. More specifically, the field of invention relates to a parsing tool for optimizing code for deployment on a serverless platform.

BACKGROUND

Serverless computing refers to a relatively new computing model in which the server infrastructure is managed by a service provider. Serverless computing allows developers to develop software applications without having to worry about building and maintaining their own server infrastructure. Serverless computing enables Function-as-a-Service ("FaaS"), which refers to a type of cloud-computing service that provides dynamically scalable functionality at the function level. FaaS provides developers an abstraction for running web applications in response to events, without having to manage any underlying servers.

FaaS systems provide the benefit of dynamic scaling, which is cost-efficient. FaaS infrastructure is provided on-demand, which means it is available when needed but it does not require any server processes to be running constantly in the background. Functions in serverless computing/FaaS systems need to be able to start up and run quickly. Functions start within milliseconds and process individual requests. If there are several simultaneous requests for a function, then the FaaS system will create as many copies of the function as necessary to meet demand. When demand drops, the application automatically scales down.

FaaS offers many benefits, such as enabling increased developer productivity and faster development time; removing concerns about server management; being easily scalable with horizontal scaling being handled by the platform; saving money because computing resources are only paid for as needed; and allowing functions to be written in different programming languages.

One metric is the amount of time it takes for an auto-scaled unit to be initialized and reach a state that it can begin handling requests, which is referred to a "cold start." For traditional applications, the cold start when adding another version of the application is in the range of powering on a computer (e.g., greater than 1 minute) because the cloud provider was most likely providing a new virtual machine for that unit. In serverless computing/FaaS systems, however, because the unit of deployment is a single function, the cold start should generally be faster than for a full application. Nevertheless, serverless computing/FaaS systems still struggle with the cold start problem, and particularly so when the source code for a particular function includes more than one function.

One challenge with using single-purpose functions is that using them creates a worse experience for the developer. Using single-purpose functions adds additional manual and cognitive work to the developer experience because it requires the developer to create a new file and set up a new configuration for each function, leading to a worse overall developer experience that slows down the adoption of serverless computing technology by developers.

Accordingly, there is a need for methods and systems that allow developers to code in their normal experience but deploy their code as optimized for a serverless computing platform.

SUMMARY

The parsing tool described herein solves the above problems by automatically parsing source code files that contain multiple functions (sometimes referred to as a "fat lambda" file) to create one or more single-purpose functions, thereby automatically reducing the functions to their smallest deployable unit for the serverless computing platform. By analyzing a syntax tree representation of the source code, the parsing tool described herein automatically determines what parts of the source code file are needed for each individual function. The parsing tool then generates an output file for each function that contains only the code needed for that function, such that the output file may be deployed on a serverless platform. The parsing tool described herein allows developers to build projects as they are accustomed to, with multiple functions in a single source code file, while still generating efficient single-purpose functions to be deployed in a serverless computing platform and/or a FaaS system. Developers may group their functions however makes sense for their project while also removing any unnecessary time from the cold starts.

As explained in more detail below, the parsing tool and the systems and methods disclosed herein provide an improvement over currently existing computing technologies in that they solve a problem of resource management in serverless development, which leads to faster loading times and more efficient use of resources (e.g., bandwidth). Thus, the parsing tool and the systems and methods disclosed herein provide a practical application that enables better serverless computing platforms that are currently known in the art.

In an embodiment, a computer-implemented method for optimizing a source code file containing a plurality of user-defined functions for deployment on a serverless platform as a plurality of single-function files is disclosed. The method includes receiving an input source code file. The method further includes creating a mapping table from the input source code file. The method further includes mapping a first function from the input source code file. The method further includes generating a single-function output file for the first function. The method further includes deploying the single-function output file. Creating the mapping table from the input source code file may include creating a list of symbols from the input source code file. Creating the mapping table from the input source code file may further include creating a list of statements from the input source code file. Creating the mapping table from the input source code file may further include perform a forward mapping of each symbol in the list of symbols. Creating the mapping table from the input source code file may further include performing a dependency mapping of each statement in the list of statements.

In another embodiment, a computing device for optimizing a source code file containing a plurality of user-defined functions for deployment on a serverless platform as a plurality of single-function files is disclosed. The computing device includes a memory. The computing device further includes at least one processor. The at least one processor is configured for receiving an input source code file. The at least one processor is further configured for creating a mapping table from the input source code file. The at least one processor is further configured for mapping a first function from the input source code file. The at least one processor is further configured for generating a single-function output file for the first function. The at least one processor is further configured for deploying the single-function output file. Creating a mapping table from the input source code file may include creating a list of symbols from the input source code file. Creating a mapping table from the input source code file may further include creating a list of statements from the input source code file. Creating a mapping table from the input source code file may further include performing a forward mapping of each symbol in the list of symbols. Creating a mapping table from the input source code file may further include performing a dependency mapping of each statement in the list of statements.

In another embodiment, a non-transitory computer-readable storage medium storing instructions implemented on at least one computing device including at least one processor that, when executed by the at least one processor, cause the at least one computing device to perform a method for optimizing a source code file containing a plurality of user-defined functions for deployment on a serverless platform as a plurality of single-function files is disclosed. The method for optimizing the source code file includes receiving an input source code file. The method further includes creating a mapping table from the input source code file. The method further includes mapping a first function from the input source code file. The method further includes generating a single-function output file for the first function. The method further includes deploying the single-function output file.

In another embodiment, a system for optimizing source code for deployment on a function-as-a-service (FaaS) serverless platform is disclosed. The system includes a computer communicatively coupled to a network, at least one FaaS provider, and at least one FaaS user. The computer is configured to receive an input source code file containing a plurality of user-defined functions. The computer is further configured to create a mapping table from the input source code file. The computer is further configured to map a first function from the input source code file. The computer is further configured to generate a single-function output file for the first function. The computer is further configured to deploy the single-function output file.

In another embodiment, a computer-implemented method comprising instructions stored on a non-transitory computer-readable storage medium and executed on a computing device provided with a hardware processor and a memory for optimizing source code for deployment on a function-as-a-service (FaaS) serverless platform is disclosed. The method includes receiving an input source code file containing a plurality of user-defined functions. The method further includes creating a mapping table from the input source code file. The method further includes mapping a first function from the input source code file. The method further includes generating a single-function output file for the first function. The method further includes deploying the single-function output file.

In various of the disclosed embodiments, the list of symbols may be created using a symbol table, the symbol table may be generated using an embedded compiler function, the list of statements may be created using a syntax tree, and/or the syntax tree may be generated using an embedded compiler function.

In various of the disclosed embodiments, each statement in the list of statements is associated with data stored in memory indicating whether an associated statement is marked for inclusion in the output file, the forward mapping of each symbol is performed using a pointer stored in memory, and/or the dependency mapping of each statement is performed using a pointer stored in memory.

In the disclosed embodiments, mapping a first function from the input source code file includes selecting a beginning symbol from the list of symbols. Mapping a first function from the input source code file further includes following a forward path from the selected symbol to a corresponding statement. The forward path is based on the forward mapping. Mapping a first function from the input source code file further includes marking the corresponding statement for inclusion.

In various of the disclosed embodiments, the first symbol in the list of symbols may be selected as the beginning symbol, or the first symbol in the list of symbols may be selected based on an included comment in the input source code file identifying a symbol for selection. The included comment in the input source code file may indicate that an associated statement imports external code from an external file.

In various of the disclosed embodiments, the method further includes importing the external file. The imported external file may be stored in an archive file. The method may further include deploying the archive file to the serverless platform with the single-function output file.

In the disclosed embodiments, generating the output single-function file for the first function includes writing each statement from the list of statements to the output single-function file that has been marked for inclusion. The statements are written to the output single-function file in the order in which they appear in the input source code file.

In disclosed embodiments, the input source code file may be accessed via a command-line interface.

BRIEF DESCRIPTION OF THE DRAWINGS

FIG. 4 illustrates an example of an input source code file.

FIG. 5A illustrates an example of a mapping table created by the parsing tool.

FIG. 5B illustrates an example of an output source code file for a first function from the input source code file of FIG. 4.

FIG. 5C illustrates an example of an output source code file for a second function from the input source code file of FIG. 4.

FIG. 5D illustrates an example of an output source code file for a third function from the input source code file of FIG. 4.

DETAILED DESCRIPTION

Figure 1:
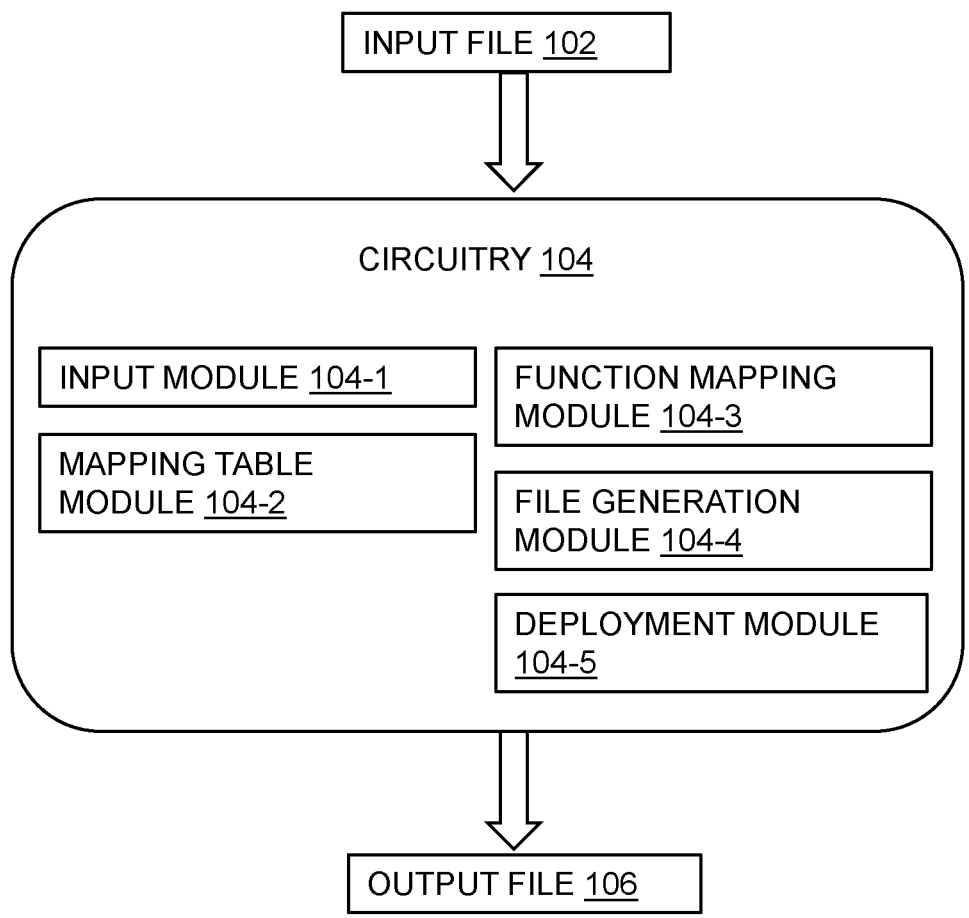
FIG. 1 illustrates an example block diagram of an apparatus implementing the parsing tool for optimizing a source code file for deployment on a serverless platform.

The following description and figures are illustrative and are not to be construed as limiting. Numerous specific details are described to provide a thorough understanding of the disclosure. In certain instances, however, well-known or conventional details are not described in order to avoid obscuring the description. References to "one embodiment" or "an embodiment" in the present disclosure may be (but are not necessarily) references to the same embodiment, and such references mean at least one of the embodiments.

Reference in this specification to "one embodiment" or "an embodiment" means that a particular feature, structure, or characteristic described in connection with the embodiment is included in at least one embodiment of the disclosure. Multiple appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

The parsing tool(s) and method(s) described herein reduces functions to their smallest deployable unit for the serverless computing platforms. By analyzing a syntax tree representation of the source code, the parsing tool described herein determines what parts of the source code file are needed for each individual function and then creates and deploys a file for each function that contains only the code needed for that function. The parsing tool allows developers to build projects as they are accustomed to, with multiple functions in a single source code file, while still generating efficient single-purpose functions to be deployed in a serverless computing platform.

The subject matter described herein parses and decomposes multi-function computer-executable software instructions or code into one or more individual, function-specific computer-executable software instructions. This automated method of parsing, or decomposition, existing code allows the existing code to be automatically optimized for deployment on serverless computing architectures, such as FaaS. Such optimization provides real-world applications and advantages by quickly and easily creating and deploying projects on cloud provider serverless platforms (FaaS) without additional, manual code modification by the developer.

The parsing tool for optimizing code described herein provides a new set of tools designed specifically for the new problems in resource management that have emerged as a result of the rise of serverless development. For example, the parsing tool optimizes developers' serverless functions to minimize cold starts and dependency sizes without causing extra friction as projects scale up. It also helps developers manage cold starts while maintaining a familiar development experience. It also helps reduce package size by only including necessary dependencies, which saves bandwidth cost for users. Accordingly, the parsing tool, and the systems and methods disclosed herein, provide an improvement over currently existing computing technologies in that they solve a problem of resource management in serverless development, which leads to faster loading times and more efficient use of resources. Thus, the parsing tool, and the systems and methods disclosed herein provide a practical application that enables better serverless computing platforms that are currently known in the art.

User-defined functions may contain dependencies within the same file (referred to as in-file dependencies) and dependencies from other files (referred to as external dependencies). The parsing tool for optimizing code described herein writes the function and the function's in-file dependencies to a new file and creates an archive (.zip file) containing the function's external dependencies.

The parsing tool for optimizing code described herein provides a tool for high-level programming languages that understands and isolates a user-defined function and its dependencies to optimize the code for deployment on a serverless platform and/or a FaaS system. It may be used with any high-level programming language, such as C, C++, Python, Javascript, Go, and Java, or the like. Such high-level programming languages use a similar general structure in which each file is a namespace that has a "global" level that consists of statements that can include functions, those functions can reference symbols and other functions defined in the global namespace, and those functions can also reference symbols and functions defined outside the original file.

The parsing tool for optimizing code described herein may be implemented either locally on a user's computer as a stand-alone package or as an add-on to a compiler or interpreter. In other embodiments, the systems and methods described herein may be implemented on one or more cloud servers, either as a stand-alone cloud-based package or as part of the serverless framework.

FIG. 1 illustrates an example block diagram of an apparatus implementing the parsing tool for optimizing a source code file for deployment on a serverless platform. Although apparatus 100 shown in FIG. 1 has a limited number of elements in a certain topology, it may be appreciated that the apparatus 100 may include more or fewer elements in alternate topologies as desired for a given implementation.

The apparatus 100 may comprise an apparatus 100 having a circuitry 104 that may represent a portion of logic in hardware that may be generally arranged to execute one or more other portions of logic that may include modules 104-1 through 104-5.

According to some examples, apparatus 100 may be implemented in a computing device, which may be either local or remote such as a cloud server. The examples are not limited in this context.

In some examples, as shown in FIG. 1, apparatus 100 includes circuitry 104. Circuitry 104 can be any of various commercially available processors, including without limitation an AMD® processor, an IBM processor, an Intel® processor, or other similar processor. Dual microprocessors, multi-core processors, and other multi-processor architectures may also be employed as circuitry 104. According to some examples, circuitry 104 may also be an application specific integrated circuit (ASIC) and at least some modules 104-1 through 104-5 may be implemented as hardware elements of the ASIC.

According to some examples, the logic of apparatus 100 may include an input module 104-1. Input module 104-1 may be executed by circuitry 104 to receive an input file 102. The input file 102 may be an input source code file containing source code written in any high-level programming language, such as C/C++, Python, Java, or the like. The input source code file 102 may be received from memory via a command-line interface (CLI) or via a graphical user interface (GUI). For example, the parsing tool for optimizing code described herein may be accessed using a CLI tool and Infrastructure as Code (IaC) SDKs to create new serverless projects or to migrate existing projects into a serverless architecture.

In some examples, the logic of apparatus 100 may also include a mapping table module 104-2. Mapping table module 104-2 may be executed by circuitry 104 to create a mapping table that maps symbols in the input source code file 102 to statements in the input source code file 102.

According to some examples, the logic of apparatus 100 may also include a function mapping module 104-3. Function mapping module 104-3 may be executed by circuitry 104 to follow all dependency paths for a specific function to identify all necessary statements from the input source code file 102 for a single-function output file.

In some examples, the logic of apparatus 100 may also include a file generation module 104-4. File generation module 104-4 may be executed by circuitry 104 to generate a new single-function output file 106 with the statements that were identified as necessary based on the dependencies in the code.

According to some examples, the logic of apparatus 100 may also include a deployment module 104-5. New file deployment module 104-5 may be executed by circuitry 104 to deploy output file 106 on a serverless platform.

Included herein is a set of logic flows representative of example methodologies for performing novel aspects of the disclosed parsing tool for optimizing source code. For ease of explanation, the methodologies discussed here are shown and described as a series of acts; however, those skilled in the art will appreciate that the methodologies are not limited by the order of acts. Some acts may, in accordance therewith, occur in a different order and/or concurrently with other acts from that shown and described herein. For example, those skilled in the art will appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic, or semiconductor storage. The embodiments are not limited in this context.

Figure 2A:
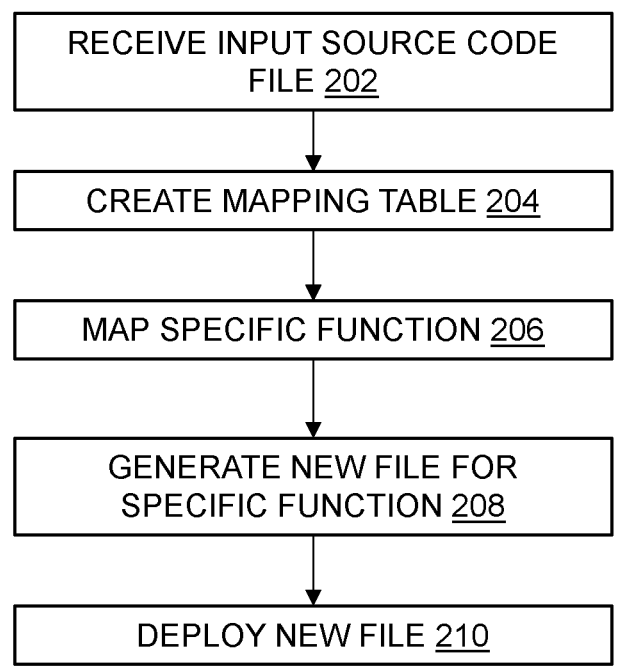
FIG. 2A illustrates an example of a logic flow for optimizing a source code file for deployment on a serverless platform.

FIG. 2A illustrates an example of a logic flow for optimizing a source code file for deployment on a serverless platform. Logic flow 200 may be representative of some or all of the operations executed by one or more logic, features, or devices described herein, such as apparatus 100. More particularly, logic flow 200 may be implemented by input module 104-1, mapping table module 104-2, function mapping module 104-3, file generation module 104-4, and/or deployment module 104-5.

In the illustrated example shown in FIG. 2A, logic flow 200 at block 202 receives an input source code file. In some examples, the input module 104-1 receives the input source code file. The input source code file may be received from local storage on the computing device, or it may be received from remote storage, for example, at a network location or on a cloud server. The source code file may be accessed via a CLI by typing a path to the location of the file, or via a GUI by selecting the location of the file.

The input source code file contains the source code for multiple functions. In some embodiments, additional input from the user may further specify a list of functions and/or a list of specific lines with the functions to parse within the source code file such that the user may generate single functions for only some of the functions within the source code file.

According to some examples, logic flow 200 at block 204 creates a mapping table. In some examples, the mapping table module 104-2 creates the mapping table. The creation of the mapping table at block 204 is described in more detail in the context of FIG. 2B.

According to some examples, logic flow 200 at block 206 maps a specific function from the input source code file. In some examples, the function mapping module 104-3 performs the mapping of the specific function. The mapping of the specific function at block 206 is described in more detail in the context of FIG. 2C.

According to some examples, logic flow 200 at block 208 generates a new file for the specific function. In some examples, the file generation module 104-4 generates a new file from the mapping of the specific function. The generation of the new file for the specific function at block 208 is described in more detail in the context of FIG. 2D.

According to some examples, logic flow 200 at block 210 may optionally deploy the new file. In some examples, the deployment module 104-5 deploys the new file. As explained above, in some embodiments, the new file being deployed is a single-function file for a serverless platform of a specific function from the input source code file. The new optimized files and archives are deployed to the FaaS provider and/or serverless platform. Examples of FaaS systems and/or serverless platforms include, for example, IBM Cloud Functions, Amazon's AWS Lambda, Google Cloud Functions, Microsoft Azure Functions, and OpenFaaS. In some embodiments, the parsing tool described herein does not directly deploy the new files but rather passes the new files to another system that performs further transformations (e.g., interpretation and compiling) and performs the final deployment.

Figure 2B:
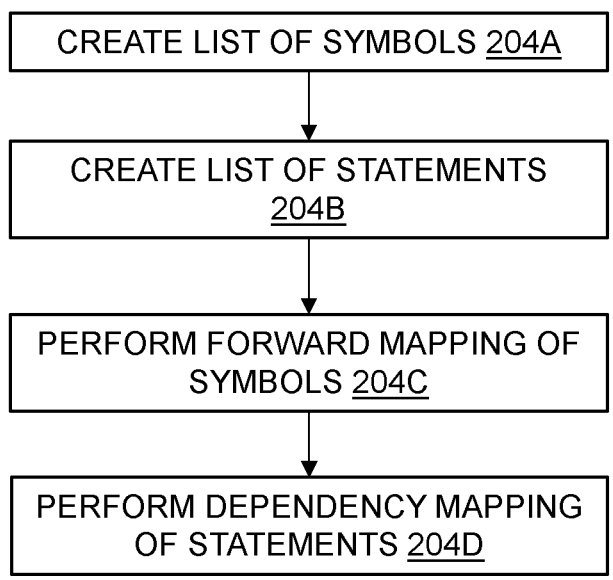
FIG. 2B illustrates an example of a logic flow for creating a mapping table when optimizing a source code file for deployment on a serverless platform.

FIG. 2B illustrates an example of a logic flow for creating a mapping table when optimizing a source code file for deployment on a serverless platform. Logic flow 204 may be representative of some or all of the operations executed by one or more logic, features, or devices described herein, such as apparatus 100. More particularly, logic flow 204 may be implemented by mapping table module 104-2.

Referring to FIG. 2B, logic flow 204 at block 204A creates a list of symbols. The list of symbols is created based on a symbol table for the input source code file. A symbol table is a well-known data structure for high-level programming languages. In many cases, the compiler or interpreter for the programming language generates the symbol table and returns a data object. For example, Python includes a library for a symbol table called symtable that is available for the user. It takes as input a string of source code and return a Python object that is a symbol table. The symbol tree is used to determine which statements in the input source code file are global symbols.

Logic flow 204 at block 204B creates a list of statements. The statements are any statements at the first level below the file level in the syntax tree representation of the input source code file and may include "import" statements, operating system calls, global-variable declarations, function declarations, and class declarations. A syntax tree is a well-known data structure for high-level programming languages. In many cases, the compiler or interpreter for the programming language generates the syntax tree and returns a data object. For example, Python includes an Abstract Syntax Tree library that is available for the user. It takes as input a string of source code and returns a Python object that is a syntax tree. The syntax tree is used by the parser to determine the statements in the input source code file. In some embodiments, for example, the statements can be determined as being the first-level functions below the global root in the syntax tree.

The list of statements created at block 204B may include a list of line numbers that indicates the boundaries of each statement in the input source code file. The line numbers include a starting line number and an ending line number. In cases where the statement is a single line, such as "import" statements and definitions of global variables, then the starting line number and the ending line number is the same. In cases where the global statement spans multiple lines, such as a top-level function, then the starting line number and the ending line number indicate the range of the function.

Logic flow 204 at block 204C performs forward mapping of the symbols. The symbols that are mapped are the list of symbols created at block 204A. The symbols are mapped from the list of symbols to the list of statements created at block 204B. The mapping associates each symbol in the list of symbols with its corresponding statement (i.e., line number(s)) from the list of statements. This may be referred to herein as a "forward mapping." This association is used to track where each global statement appears in the input source code file. This association may be stored in memory in various ways, as will be appreciated by a person having ordinary skill in the art. For example, the association may be made using a pointer or relational link. The association may be made by creating additional entries in the list of symbols and/or the list of statements.

Logic flow 204 at block 204D performs dependency mapping of the statements. The statements that are mapped are the list of statements created at block 204B. The mapping associates each statement in the list of statements with each of the symbols upon which the statement depends. This may be referred to herein as a "dependency mapping." The determination is made by looking at the syntax tree to determine any symbols that are called from within the statement. For example, in one embodiment, the determination is made by traversing the syntax tree and looking for nodes that use variables. In python, for example, the parsing tool looks for use of the "Name" expression in any of the nodes in the syntax tree. In other programming languages, the parsing tool visits every node that is a descendant of the statement being examined and looks for odes using variables. When doing this, the parsing tool may track whether the symbols are local symbols declared in the function or global symbols from the file that need to be tracked. In other embodiments, the determination may be made by using extra functionality in the symtable library that allows the parsing tool to get a symbol table of individual functions. This results in the same output (i.e., global symbols used in the statement), and it is correct because it is the canonical python implementation.

Figure 2C:
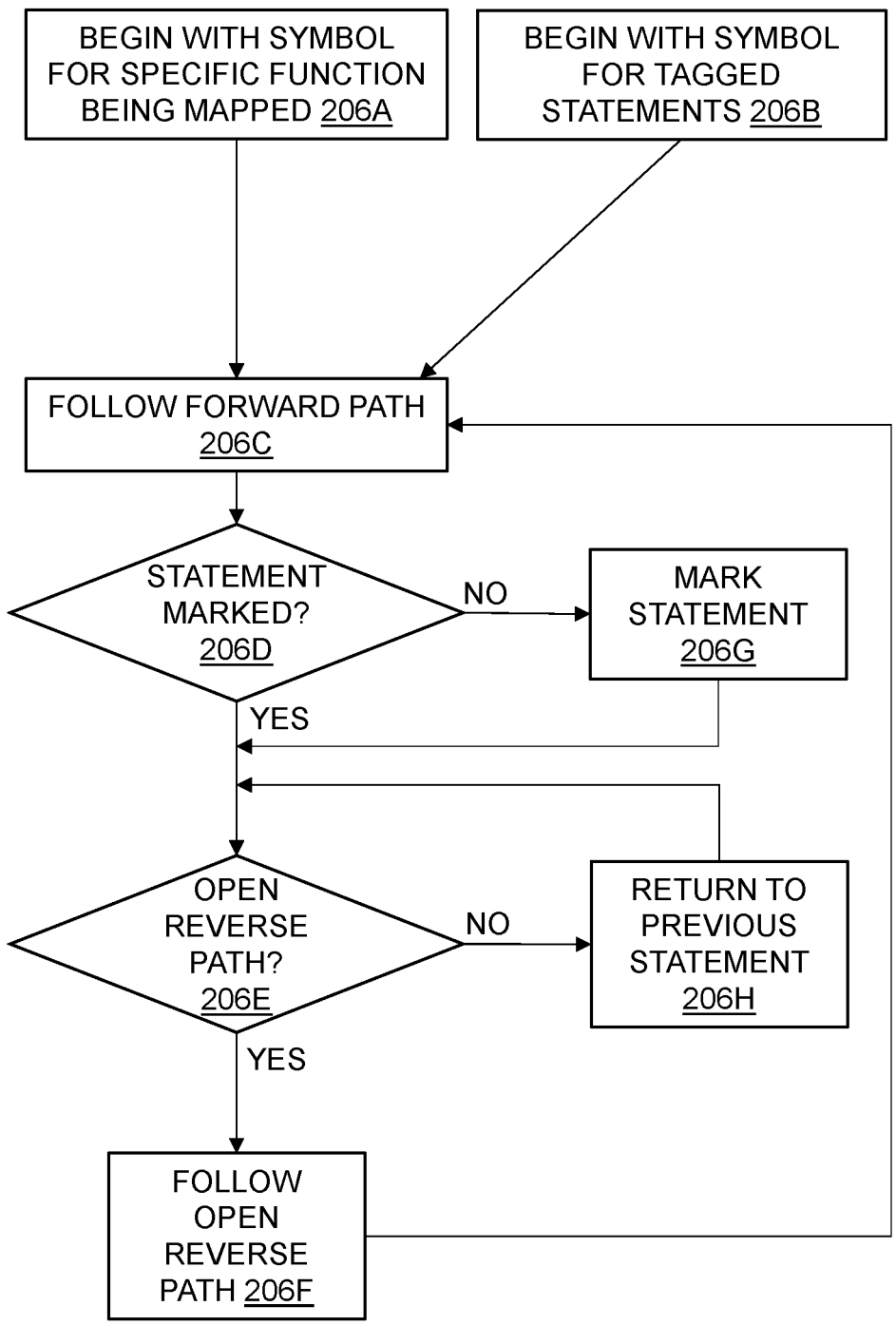
FIG. 2C illustrates an example of a logic flow for mapping a function when optimizing a source code file for deployment on a serverless platform.

FIG. 2C illustrates an example of a logic flow for mapping a function when optimizing a source code file for deployment on a serverless platform. Logic flow 206 may be representative of some or all of the operations executed by one or more logic, features, or devices described herein, such as apparatus 100. More particularly, logic flow 206 may be implemented by function mapping module 104-3.

Referring to FIG. 2C, logic flow 206 may begin either at block 206A with a symbol for the specific function being mapped or at block 206B with a tagged statement. Some input source code files may include one or more statements that do not necessarily have a dependency from a function being analyzed but nevertheless still need to be included with the function to make the function operate properly. For example, such a statement may include an operating system call. These types of statements are not otherwise picked up by the symbol table. To ensure that the parsing tool described herein knows to include each such statement, each such statement may include a manually or automatically added identification tag or other type of code that indicates to the parsing tool that it should include such a statement. In some embodiments, the parsing tool described herein may automatically check for popular statements to which an identification tag is automatically added. This adding of the identification tags may be automatically handled, or it may be done manually by the developer when writing the code. In some embodiments, the added identification tag is a comment in the source code using a well-known comment functionality. By beginning with a tagged statement, as shown in block 206B, that ensures that the tagged statement will get marked at block 206G and therefore be included in the output file.

Regardless of which symbol logic flow 206 begins with, logic flow 206 follows forward path at block 206C for the particular symbol being analyzed. The forward path is the forward mapping from the symbol to the statement that was created at block 204C as part of logic flow 204. Each statement in the list of statements will have an indication of whether that statement should be included in the single-function file that is being created. The indication may be a Boolean value or other type of flag that represents whether that statement should or should not be included.

Logic flow 206 at block 206D checks whether the statement found by following the forward path at block 206C has been marked for inclusion in the single-function file. If the statement has not been marked, then logic flow 206 marks the statement at block 206G. As explained, the marking may be by setting the Boolean value or flag to TRUE. Once the statement has been marked, or if the statement was already marked (as determined at block 206D), then the logic flow 206 determines at block 206E if there is an open reverse path (or "dependency mapping") for the statement being evaluated. As explained above, the mapping from statements to symbols is a one-to-many mapping such that each statement may be mapped to multiple symbols. The open reverse path refers to a reverse path from the statement that has not yet been followed back to the symbol.

If there is an open reverse path from the statement to a symbol, then logic flow 206 at block 206F follows that open reverse path back to the corresponding symbol. The logic flow 206 then returns to block 206C to follow the forward path for the symbol. If there is not an open reverse path from the statement to a symbol, then that means the logic flow 206 has already reached the end of the dependency mapping for the statement and so it returns to the previous statement at block 206H. At the previous statement, the logic flow 206 checks that statement for an open reverse path at black 206E.

In this way, the logic flow 206 works recursively to follow each path from symbol to statement, and then back to each symbol upon which that statement depends. Each time the logic flow 206 arrives at a statement that has not previously been marked for inclusion in the single-function file, it marks that statement. In other embodiments, the logic flow 206 may work iteratively rather than recursively to follow each path from symbol to statement and back to each symbol.

After logic flow 206 has exhausted the function or tagged statements it began with, it will do the other one. In other words, logic flow 206 will map both the function and the tagged statement(s) before finishing, but it may do so in either order.

Figure 2D:
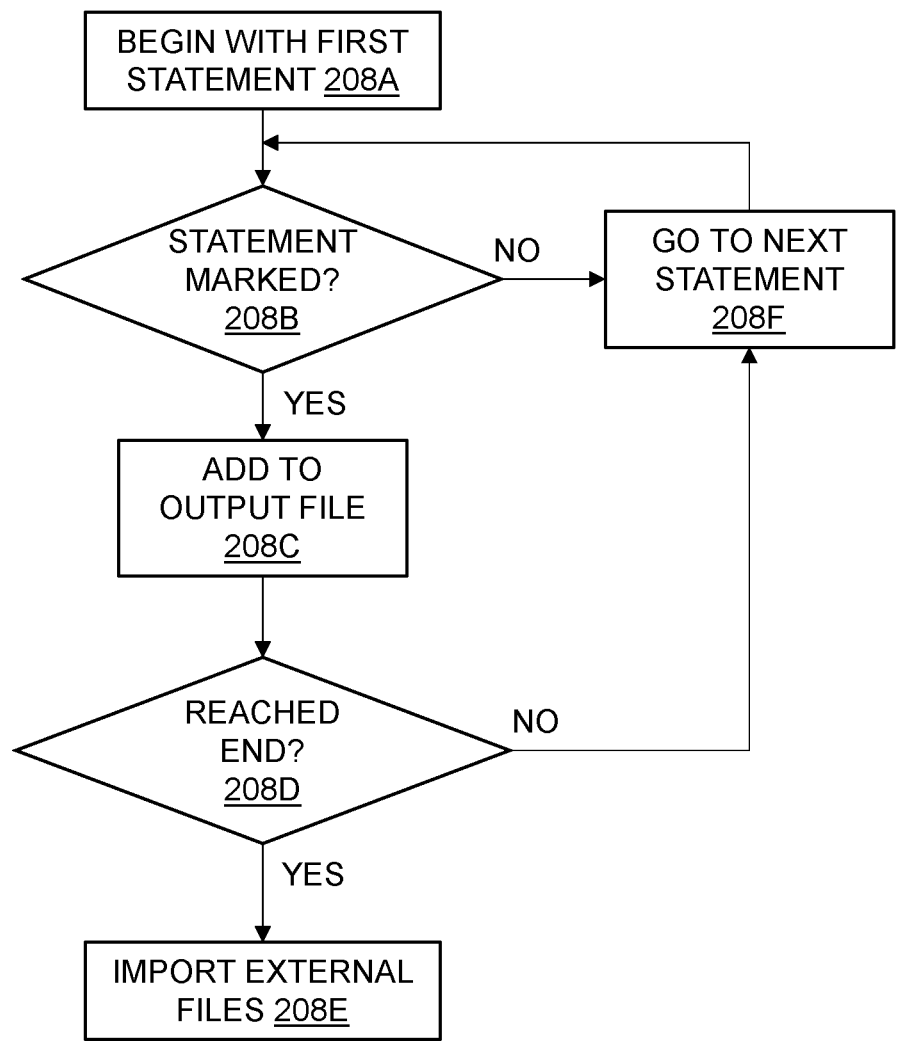
FIG. 2D illustrates an example of a logic flow for generating a file when optimizing a source code file for deployment on a serverless platform.

FIG. 2D illustrates an example of a logic flow for generating a file when optimizing a source code file for deployment on a serverless platform. Logic flow 208 may be representative of some or all of the operations executed by one or more logic, features, or devices described herein, such as apparatus 100. More particularly, logic flow 208 may be implemented by file generation module 104-4.

According to some examples, logic flow 208 generates an output source code file for each function from the source code file. Once all the dependencies are determined, all the dependent statements and the user-defined functions are written to an output source code file. The statements are written in order based on their order in the input source code file.

Referring to FIG. 2D, logic flow 208 begins at block 208A with the first statement in the list of statements that was created at block 204B. The logic flow 208 determines at block 208B whether the statement is marked for inclusion in the single-function output file. If so, then logic flow 208 adds the statement to the output file at block 208C. If not, then logic flow 208 goes to the next statement in the list of statements at block 208F and then determines whether that statement is marked for inclusion at block 208B.

After the statement has been added to the output file at block 208C, the logic flow 208 determines at block 208D whether the end of the statements has been reached. If not, then logic flow 208 goes to the next statement at block 208F and then determines whether that statement is marked for inclusion at block 208B. When it is determined that the end of the statements has been reached, then logic flow 208 imports any external files at block 208E.

If the statement is an "import" statement, then it may need to be included with the function. High-level programming languages generally each have their own import rules. In the embodiments described herein, the parsing tool will only import an external file based on an import call if that external file is called by the function being analyzed. All the statements are checked to determine if any are imports of code from external files (i.e., if there are external dependencies). If there are external dependencies, the parsing tool uses the dependency management system for the programming language to locate the external code. Once located, the parsing tool adds the external code to an archive that will be deployed with the function.

Eliminating unnecessary global statements is important because of the way programs are structured and executed. When a cloud provider loads code to run a particular function as part of a serverless or FaaS platform, they import the file in which the function is located, which executes all global statements in the file before the function is run. Thus, if the file includes an unnecessary global statement that does something like establish an unnecessary database connection or connect to an unnecessary external service, the user will have to wait for those connection to occur before the function can run.

Figure 3:
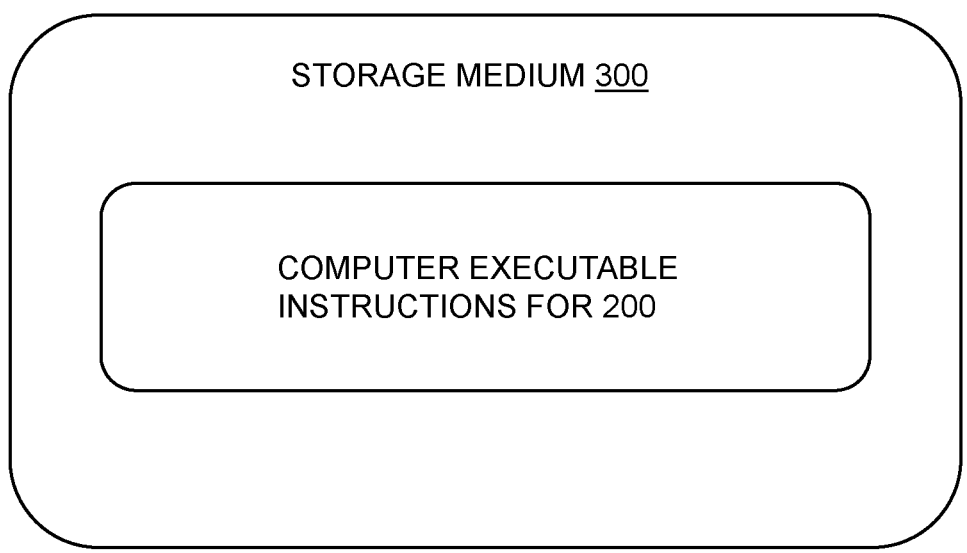
FIG. 3 illustrates an example of a first storage medium.

FIG. 3 illustrates an example of a first storage medium. As shown in FIG. 3, the first storage medium includes storage medium 300. Storage medium 300 may comprise an article of manufacture. In some examples, storage medium 300 may include any non-transitory computer readable medium or machine readable medium, such as an optical, magnetic or semiconductor storage. Storage medium 300 may store various types of computer executable instructions, such as instructions to implement logic flow 200. Examples of a computer-readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

FIG. 4 illustrates an example of an input source code file. Referring to FIG. 4, the input source code file 102 may include one or more import calls 402. Import calls 402 may be used to import one or more libraries to be used in the source code.

The input source code file 102 may include one or more global statements 404. For example, as shown in FIG. 4, the line 404b (os.mkdir("newdir")) is a global statement. The line 404a (#<Z>) is an identifier tag that has been added to the source code as a comment to indicate to the parsing tool that the following line (line 404b) is a global statement.

The input source code file 102 may include one or more global declaration statements 406. The global declaration statements define global variables that may be used by one or more of the functions in the source code file 102.

The input source code file 102 may include one or more functions 408, 410, and 412.

In one embodiment, the calls to the parsing tool to generate single-function output file for each of the three functions in input source code file 102 may be as follows:

```
(1) cdev.parse_function_from_file("<path_to_folder>/example.py",
"myfunction1")
(2) cdev.parse_function_from_file("<path_to_folder>/example.py",
"myfunction2")
(3) cdev.parse_function_from_file("<path_to_folder>/example.py",
"myfunction3",
manual_includes=["Z"])
```

Command (1) above will cause the parsing tool described herein to generate a single-function output file for myfunction1( ) from the input source code file. Command (2) above will cause the parsing tool described herein to generate a single-function output file for myfunction2( ) from the input source code file. Command (3) above will cause the parsing tool described herein to generate a single-function output file for myfunction3( ) from the input source code file. Note that command (3) includes an additional argument that causes the parsing tool to include a manually included statement in the single-function output file.

FIG. 5A illustrates an example of a list of statements created by the parsing tool to generate out output source code file. Referring to FIG. 5A, the parsing tool creates the list of symbols 502 from input source code file 102. The parsing tool creates the list of statements 504 from the input source code file. The parsing tool, in response to the input command to create a single-function file for myfunction1( ) shown in FIG. 5A, fills out the list of statements 504 with "yes" values indicating those statements should be included for myfunction1( ).

FIG. 5B illustrates an example of an output source code file for a first function generated by the parsing tool from the input source code file of FIG. 4. Referring to FIG. 5B, output source code file 506 is created for myfunction1( ). The list of statements 504 from FIG. 5A is used to generate output source code file 506 for myfunction1( ), with the statements marked for inclusion as being included in the output. Only one of the import statements 402 is included in the output source code file for myfunction1( ) because it is the only import statement that is needed for the operation of myfunction1( ). Similarly, only two of the declaration statements 406 are included in the output source code file for myfunction1( ) because they are the only declaration statements that are needed for the operation of myfunction1( ). Myfunction1( ) is also included in the output source code file 506.

FIG. 5C illustrates an example of an output source code file for a second function generated by the parsing tool from the input source code file of FIG. 4. Referring to FIG. 5C, output source code file 508 is created for myfunction2( ). None of the import statements 402 are included in the output source code file for myfunction2( ) because myfunction2( ) does not include any calls that require any of the import statements 402. Only two of the declaration statements 406 are included in the output source code file for myfunction2( ) because they are the only declaration statements that are needed for the operation of myfunction2( ). Myfunction2( ) is also included in the output source code file 508.

FIG. 5D illustrates an example of an output source code file for a third function generated by the parsing tool from the input source code file of FIG. 4. Referring to FIG. 5D, output source code file 510 is created for myfunction3( ). Only one of the import statements 402 is included in the output source code file for myfunction3( ) because it is the only import statement that is needed for the operation of myfunction3( ). Additionally, the statement 404b is included in the output source code file 510 for myfunction3( ) based on the identification tag 404a. Myfunction3( ) is also included in the output source code file 510.

Figure 6:
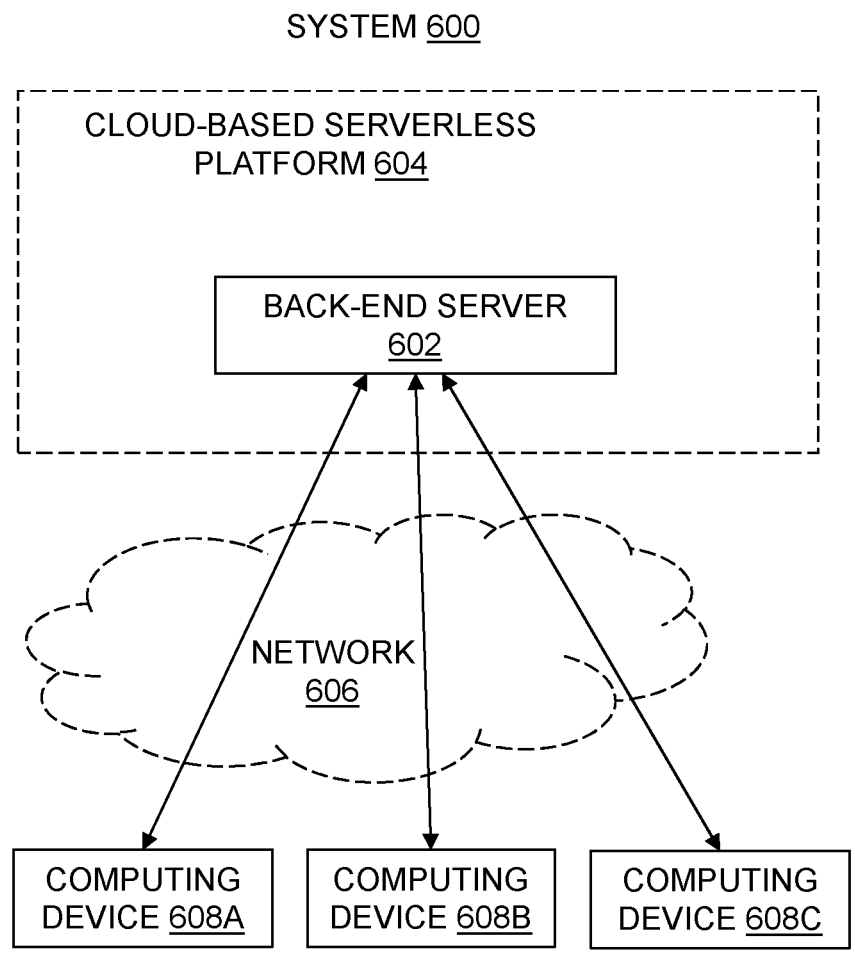
FIG. 6 illustrates an example of a system implementing the parsing tool for optimizing code for deployment on a serverless platform.

FIG. 6 illustrates an example of a system implementing the parsing tool for optimizing code for deployment on a serverless platform.

The system 600 includes a cloud-based serverless platform 604 hosted on one or more back-end servers 602. The back-end server 602 may communicate with a plurality of computing devices 608A-C. The computing devices 608A-C and their users may access the cloud-based serverless platform 604. The computing devices 608A-C may be smart tablets, laptops, workstations, PCs, or the like. The computing devices 608A-C may communicate with the back-end server 602 over a network 606. The network 606 may be any type or combination of wired, wireless, and/or optical networks.

Figure 7:
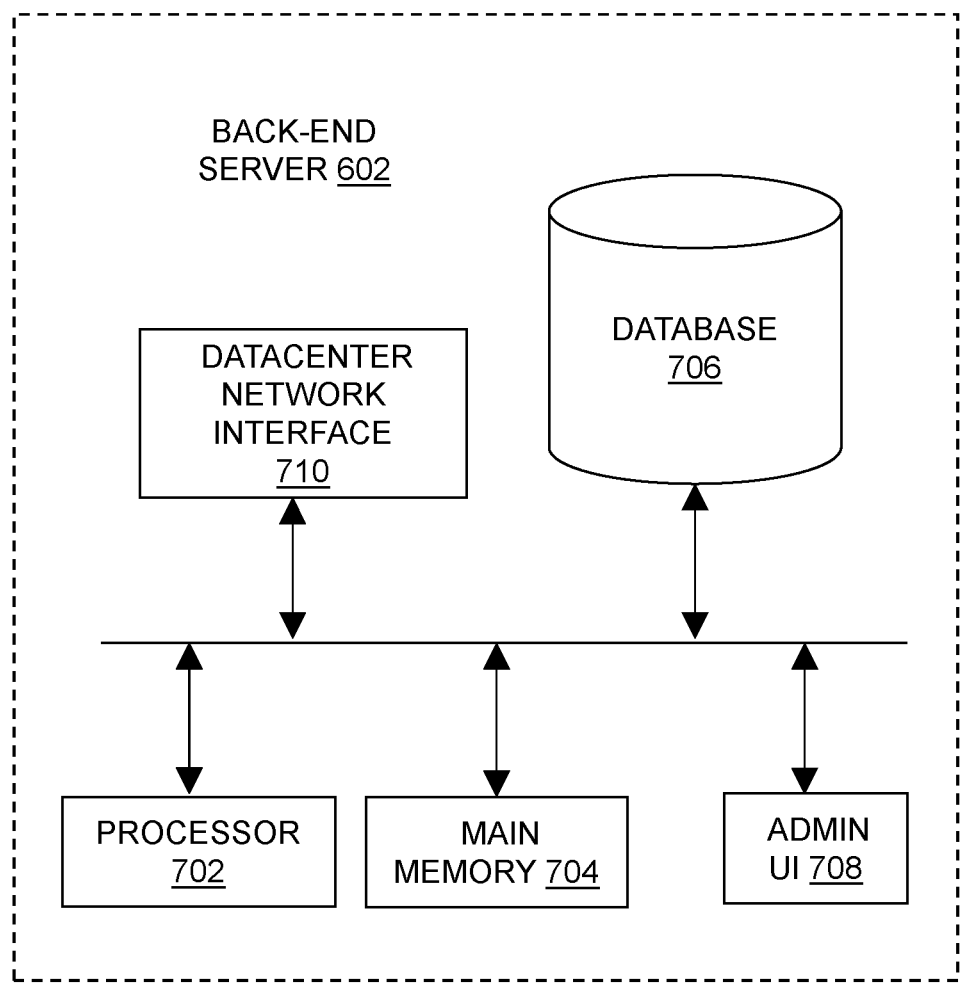
FIG. 7 illustrates an example block diagram of one embodiment of the back-end server 602 of FIG. 6.

FIG. 7 illustrates an example block diagram of one embodiment of the back-end server 602 of FIG. 6.

The back-end server 602 may include at least one of processor 702, a main memory 704, a database 706, an administration user interface (UI) 708, and a datacenter network interface 710. The processor 702 may be a multi-core server class processor suitable for hardware virtualization. The processor may support at least a 64-bit architecture and a single instruction multiple data (SIMD) instruction set. The main memory 704 may include a combination of volatile memory (e.g., random-access memory) and non-volatile memory (e.g. flash memory). The database 706 may include one or more hard drives. The datacenter network interface 710 may provide one or more high-speed communication ports to the data center switches, routers, and/or network storage appliances. The datacenter network interface 710 may include high-speed optical Ethernet, Infini-Band (IB), Internet Small Computer System Interface (iSCSI), and/or Fibre Channel interfaces. The administration UI may support local and/or remote configuration of the back-end server 602 by a datacenter administrator.

Figure 8:
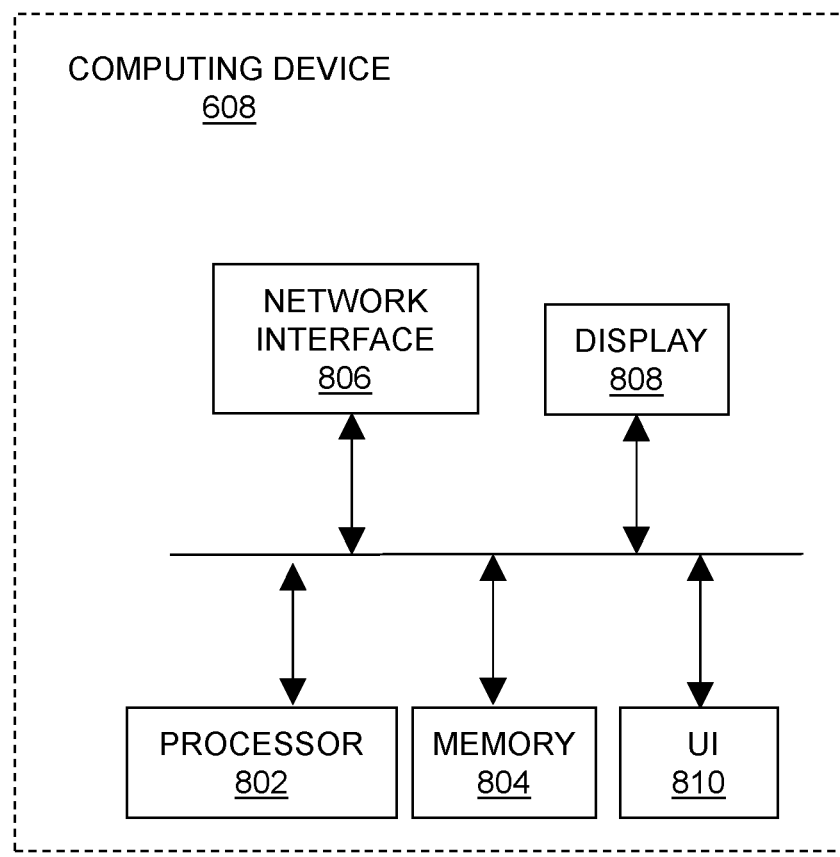
FIG. 8 depicts a block diagram illustrating one embodiment of a computing device 608 of FIG. 6.

FIG. 8 depicts a block diagram illustrating one embodiment of a computing device 608 of FIG. 6.

The computing device 608 may be any of the computing devices 608A-C of FIG. 6. The computing device 608 may include at least one processor 802, a memory 804, a network interface 806, a display 808, and a UI 810. The memory 804 may be partially integrated with the processor 802. The UI 810 may include a keyboard and a mouse. The display 808 and the UI 810 may provide any of the GUIs in the embodiments of this disclosure.

Figure 9:
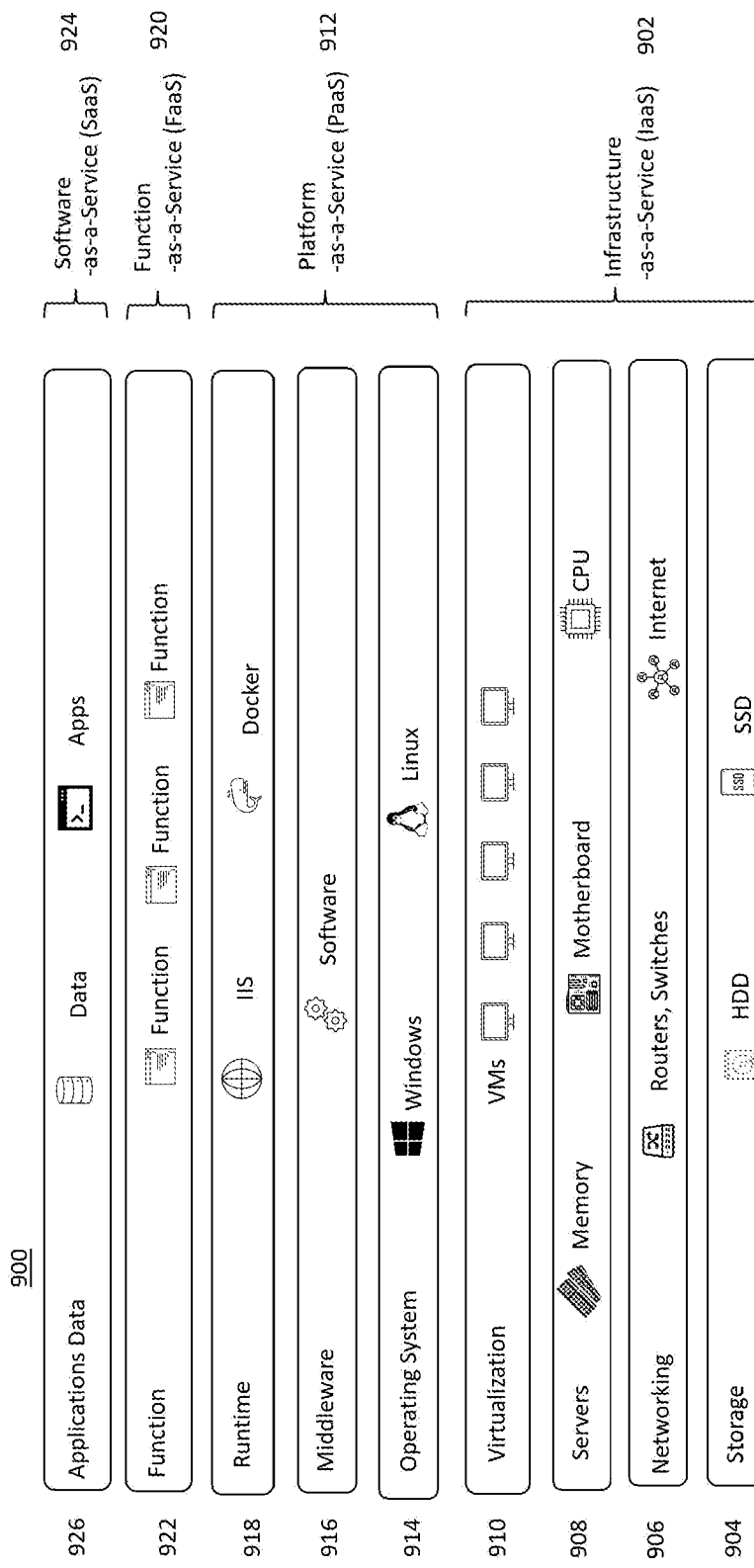
FIG. 9 illustrates an example of a system implementing the parsing tool for optimizing code for deployment on a serverless platform.

FIG. 9 is an illustration of an exemplary function-as-a-service (FaaS) model as an example of a system implementing the parsing tool for optimizing code for deployment on a serverless platform. Referring to FIG. 9, functionality 900 can be logically divided into layers. Layers may be ordered from least to greatest abstraction of underlying physical resources. Layers may also be divided into groups based on common features for simplicity when referring or billing functions associated with each group.

Infrastructure 902 includes storage function 904, networking function 906, server function 908, and virtualization function 910. Infrastructure functions 904-910 may be bundled together and provided to one or more tenants as a service, referred to as Infrastructure-as-a-Service (IaaS). IaaS is made up of a collection of physical and virtualized resources that provide consumers with the basic building blocks needed to run applications and workloads in the cloud.

Storage function 904 provides storage of data without requiring the user or tenant to be aware of how this data storage is managed. Three types of cloud storage that may be provided by storage function 904 are block storage, file storage, and object storage. Object storage is the most common mode of storage in the cloud because that it is highly distributed (and thus resilient), data can be accessed easily over HTTP, and performance scales linearly as the storage grows.

Networking function 906 in the cloud is a form of software defined networking in which traditional networking hardware, such as routers and switches, are made available programmatically, typically through APIs.

Server function 908 refers to various physical hardware resources associated with executing computer-readable code that is not otherwise part of the virtualized network resources in networking function 906 or storage function 904. IaaS providers manage large data centers, typically around the world, that contain the servers powering the various layers of abstraction on top of them and that are made available to end users. In most IaaS models, end users do not interact directly with the physical infrastructure (e.g., memory, motherboard, CPU), but it is provided as a service to them.

Virtualization function 910 provides virtualization of underlying resources via one or more virtual machines (VMs). Virtualization relies on software to simulate hardware functionality and create a virtual computer system. A virtual computer system is known as a "virtual machine" (VM): a tightly isolated software container with an operating system and application inside. Each self-contained VM is completely independent. Putting multiple VMs on a single computer enables several operating systems and applications to run on just one physical server, or "host." A thin layer of software called a "hypervisor" decouples the virtual machines from the host and dynamically allocates computing resources to each virtual machine as needed. Providers manage hypervisors and end users can then programmatically provision virtual "instances" with desired amounts of compute and memory (and sometimes storage). Most providers offer both CPUs and GPUs for different types of workloads.

Platform 912 includes operating system function 914, middleware function 916, and runtime function 918. Infrastructure functions 904-910 and platform functions 914-918 may be bundled together and provided to one or more tenants as a service, referred to as Platform-as-a-Service (PaaS). In the Platform-as-a-Service (PaaS) model, developers rent everything needed to build an application, relying on a cloud provider for development tools, infrastructure, and operating systems.

Operating system function 914 refers to a PaaS vendor providing and maintaining the operating system that developers use, and the application runs on. For example, Windows and Linux operating systems may be installed in virtual machines and Windows or Linux applications may be run within the operating system.

Middleware function 916 is software that sits between user-facing applications and the machine's operating system. For example, middleware may allow software to access input from the keyboard and mouse. Middleware is necessary for running an application, but end users don't interact with it. Relatedly, middleware function 916 may also include tools that are necessary for software development, such as a source code editor, a debugger, and a compiler. These tools may be offered together as a framework.

Runtime function 918 is software code that implements portions of a programming language's execution model. A runtime system or runtime environment implements portions of an execution model. Most programming languages have some form of runtime system that provides an environment in which programs run. This environment may address issues including the management of application memory, how the program accesses variables, mechanisms for passing parameters between procedures, interfacing with the operating system, and otherwise. The compiler makes assumptions depending on the specific runtime system to generate correct code. Typically, the runtime system will have some responsibility for setting up and managing the stack and heap, and may include features such as garbage collection, threads or other dynamic features built into the language.

Function layer 920 includes one or more individual functions 926. Infrastructure functions 904-910, platform functions 914-918, and function layer 922 may be bundled together and provided to one or more tenants as a Function-as-a-Service (FaaS) service of a serverless computing platform.

FaaS is a serverless way to execute modular pieces of code (functions), which are executed in response to an event, such as a user clicking on an element in a web application. This contrasts with monolithic applications which include multiple functions that are interwoven into one large system. While FaaS may be like SaaS, instead of deploying an entire application to one or more servers, with FaaS, only functions, or parts of an application, are installed. The functions are then loaded when needed and can be executed in parallel on-demand.

Serverless architectures, such as the FaaS example shown in FIG. 9, can include applications where server-side logic is written by the application developer, but, unlike traditional architectures, this server-side logic is executed in stateless compute containers that are event-triggered, ephemeral (may only last for one invocation), and fully managed by a third party. Example commercial implementations of a Functions-as-a-Service platform include AWS Lambda, Google Cloud Functions, and Microsoft Azure Functions for Serverless Computing.

It is appreciated that individual functions 922 within a Functions-as-a-Service platform may preferably have the following features. First, each function performs only one action in response to an event. Second, each function does not make calls (i.e., reference) other functions. Third, each functions uses a minimum number of libraries. Each of these features of FaaS functions allows for code that is scope limited, isolated, efficient, and lightweight so that the functions load and execute quickly and are highly scalable. Using the subject matter described herein to parse code written for monolithic applications allows developers to optimize existing code for deployment on a Functions-as-a-Service platform while taking advantage of the features mentioned above.

Software 924 includes applications and data function 922. Infrastructure functions 904-910, platform functions 914-918, functions 922, and software function 926 may be bundled together and provided to one or more tenants as a service, referred to as Software-as-a-Service (SaaS). Applications and data function 926 is the application and associated data created and managed by the user. For example, an application programmed by the user for provided certain functionality disclosed herein may be exposed to the end user via a front end interface such as a web browser or dedicated front end client application. Neither the front end user nor the back end developer is required to manage or maintain services provided by platform 912 and infrastructure 902. This contrasts with on-site hosting of the same functionality.

The system disclosed herein may be implemented as a client/server type architecture but may also be implemented using other architectures, such as cloud computing, function as a service model (FaaS), a serverless mode, a mainframe/terminal model, a stand-alone computer model, a plurality of non-transitory lines of code on a computer readable medium that can be loaded onto a computer system, a plurality of non-transitory lines of code downloadable to a computer, and the like.

The system may be implemented as one or more computing devices that connect to, communicate with and/or exchange data over a link that interact with each other. Each computing device may be a processing unit-based device with sufficient processing power, memory/storage and connectivity/communications capabilities to connect to and interact with the system. For example, each computing device may be an Apple iPhone or iPad product, a Blackberry or Nokia product, a mobile product that executes the Android operating system, a personal computer, a tablet computer, a laptop computer and the like and the system is not limited to operate with any particular computing device. The link may be any wired or wireless communications link that allows the one or more computing devices and the system to communicate with each other. In one example, the link may be a combination of wireless digital data networks that connect to the computing devices and the Internet. The system may be implemented as one or more server computers (all located at one geographic location or in disparate locations) that execute a plurality of lines of non-transitory computer code to implement the functions and operations of the system as described herein. Alternatively, the system may be implemented as a hardware unit in which the functions and operations of the back-end system are programmed into a hardware system. In one implementation, the one or more server computers may use Intel® processors, run the Linux operating system, and execute Java, Ruby, Regular Expression, Flex 4.0, SQL etc.

In some embodiments, each computing device may further comprise a display and a browser application so that the display can display information generated by the system. The browser application may be a plurality of non-transitory lines of computer code executed by a processing unit of the computing device. Each computing device may also have the usual components of a computing device such as one or more processing units, memory, permanent storage, wireless/wired communication circuitry, an operating system, etc.

The system may further comprise a server (that may be software based or hardware based) that allows each computing device to connect to and interact with the system such as sending information and receiving information from the computing devices that is executed by one or more processing units. The system may further comprise software- or hardware-based modules and database(s) for processing and storing content associated with the system, metadata generated by the system for each piece of content, user preferences, and the like.

In one embodiment, the system includes one or more processors, server, clients, data storage devices, and non-transitory computer readable instructions that, when executed by a processor, cause a device to perform one or more functions. It is appreciated that the functions described herein may be performed by a single device or may be distributed across multiple devices.

As will be appreciated by one skilled in the art, aspects of the technology described herein may be embodied as a system, method or computer program product. Accordingly, aspects of the technology may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the technology may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the technology described herein may be written in any combination of one or more programming languages, including object oriented and/or procedural programming languages. Programming languages may include, but are not limited to: Ruby®, JavaScript®, Java®, Python®, PHP, C, C++, C#, Objective-C®, Go®, Scala®, Swift®, Kotlin®, OCaml®, or the like. The program code may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the technology described herein refer to flowchart illustrations and/or block diagrams of methods, apparatus (systems) and computer program products according to various embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the technology described herein. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a," "an" and "the" are intended to include the plural forms as well, unless the context clearly indicates otherwise. Thus, for example, reference to "a user" can include a plurality of such users, and so forth. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description provided herein has been presented for purposes of illustration and description, but is not intended to be exhaustive or limited to the specific form disclosed. Many modifications and variations will be apparent to those of ordinary skill in the art without departing from the scope and spirit of the disclosure. The embodiment was chosen and described in order to best explain the principles described herein and the practical application of those principles, and to enable others of ordinary skill in the art to understand the technology for various embodiments with various modifications as are suited to the particular use contemplated.

The descriptions of the various embodiments of the technology disclosed herein have been presented for purposes of illustration, but these descriptions are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for optimizing a source code file containing a plurality of user-defined functions for deployment on a serverless platform as a plurality of single-function files, the method comprising:
    receiving an input source code file;
    creating a mapping table from the input source code file, wherein creating the mapping table from the input source code file comprises:
        creating a list of symbols from the input source code file;
        creating a list of statements from the input source code file;
        performing a forward mapping of each symbol in the list of symbols; and
        performing a dependency mapping of each statement in the list of statements;
    mapping a first function from the input source code file, wherein mapping the first function from the input source code file comprises:
        selecting a beginning symbol from the list of symbols;
        following a forward path from the selected symbol to a corresponding statement,
            wherein the forward path is based on the forward mapping; and
        marking the corresponding statement for inclusion;
    generating a single-function output file for the first function; and
    deploying the single-function output file.

2. The computer-implemented method of claim 1, wherein the list of symbols is created using a symbol table, or the list of statements is created using a syntax tree.

3. The computer-implemented method of claim 1, wherein each statement in the list of statements is associated with data stored in memory indicating whether an associated statement is marked for inclusion in the single-function output file.

4. The computer-implemented method of claim 1, wherein at least one of the forward mapping of each symbol and the dependency mapping of each statement is performed using a pointer stored in memory.

5. The computer-implemented method of claim 1, wherein the first symbol in the list of symbols is selected as the beginning symbol or is selected based on an included comment in the input source code file identifying a symbol for selection.

6. The computer-implemented method of claim 5, wherein the included comment in the input source code file indicates that an associated statement imports external code from an external file.

7. The computer-implemented method of claim 1, wherein generating the single-function output file for the first function comprises:
writing each statement from the list of statements to the single-function output file that has been marked for inclusion,
wherein the statements are written to the single-function output file in the order in which they appear in the input source code file.

8. A computing device for optimizing a source code file containing a plurality of user-defined functions for deployment on a serverless platform as a plurality of single-function files, the computing device comprising:
a memory; and
at least one processor configured for:
receiving an input source code file;
creating a mapping table from the input source code file, wherein creating the mapping table from the input source code file comprises:
creating a list of symbols from the input source code file;
creating a list of statements from the input source code file;
performing a forward mapping of each symbol in the list of symbols; and
performing a dependency mapping of each statement in the list of statements;
mapping a first function from the input source code file, wherein mapping the first function from the input source code file comprises:
selecting a beginning symbol from the list of symbols;
following a forward path from the selected symbol to a corresponding statement,
wherein the forward path is based on the forward mapping; and
marking the corresponding statement for inclusion;
generating a single-function output file for the first function; and
deploying the single-function output file.

9. The computing device of claim 8, wherein the list of symbols is created using a symbol table, or the list of statements is created using a syntax tree.

10. The computing device of claim 8, wherein each statement in the list of statements is associated with data stored in memory indicating whether an associated statement is marked for inclusion in the single-function output file.

11. The computing device of claim 8, wherein at least one of the forward mapping of each symbol and the dependency mapping of each statement is performed using a pointer stored in memory.

12. The computing device of claim 8, wherein the first symbol in the list of symbols is selected as the beginning symbol or is selected based on an included comment in the input source code file identifying a symbol for selection.

13. The computing device of claim 12, wherein the included comment in the input source code file indicates that an associated statement imports external code from an external file.

14. The computing device of claim 13, further comprising importing the external file, wherein the imported external file is stored in an archive file, and deploying the archive file to the serverless platform with the single-function output file.

15. The computing device of claim 8, wherein generating the single-function output file for the first function comprises:
writing each statement from the list of statements to the single-function output file that has been marked for inclusion,
wherein the statements are written to the single-function output file in the order in which they appear in the input source code file.

16. A system for optimizing source code for deployment on a function-as-a-service (FaaS) serverless platform, the system comprising:
a computer communicatively coupled to a network, at least one FaaS provider, and at least one FaaS user, wherein the computer is configured to:
receive an input source code file containing a plurality of user-defined functions;
create a mapping table from the input source code file, wherein creating the mapping table from the input source code file comprises:
creating a list of symbols from the input source code file;
creating a list of statements from the input source code file;
performing a forward mapping of each symbol in the list of symbols; and
performing a dependency mapping of each statement in the list of statements;
map a first function from the input source code file, wherein mapping the first function from the input source code file comprises:
selecting a beginning symbol from the list of symbols;
following a forward path from the selected symbol to a corresponding statement,
wherein the forward path is based on the forward mapping; and
marking the corresponding statement for inclusion;
generate a single-function output file for the first function; and
deploy the single-function output file.

* * * * *